Figure 1:
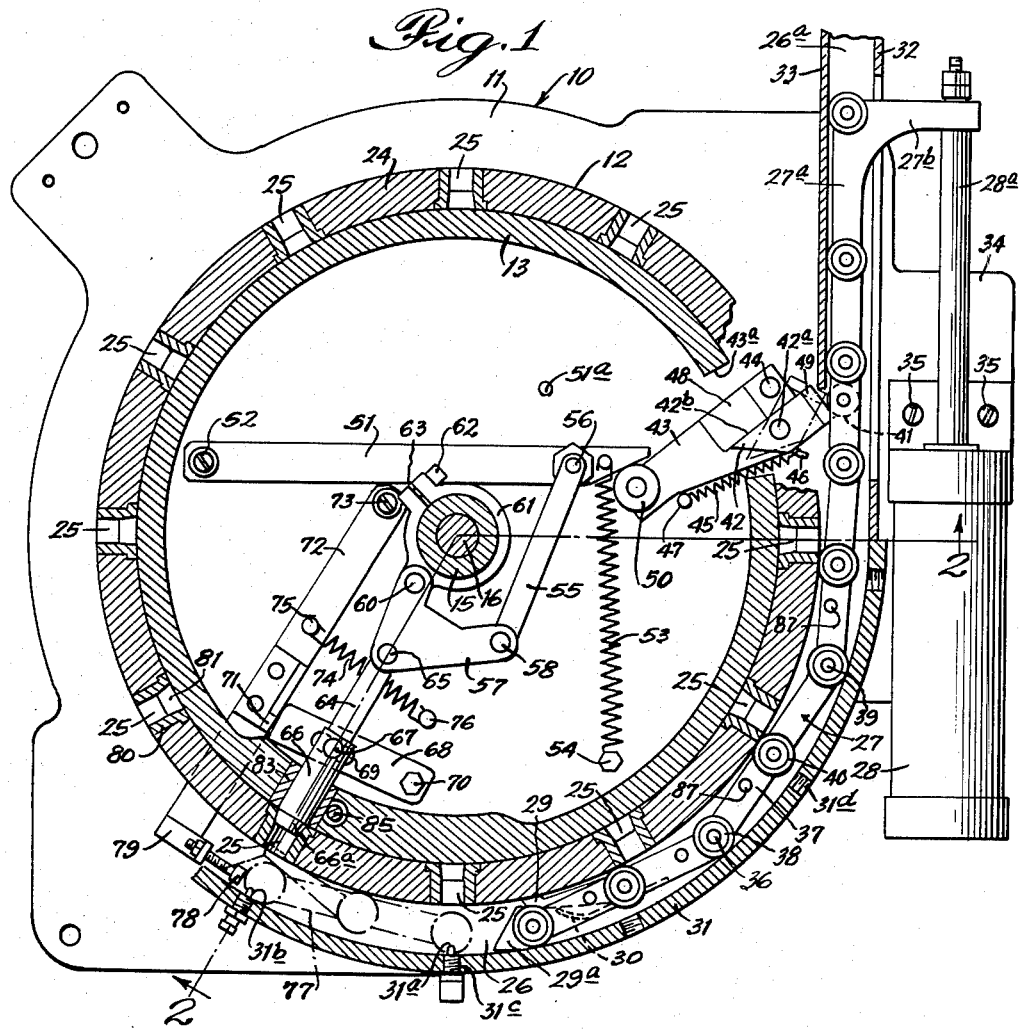

Jan. 24, 1961

T. E. MEAD 2,968,973

WORK FEEDING DEVICE

Filed Aug. 29, 1958

3 Sheets-Sheet 1

INVENTOR:
Theodore E. Mead,
BY Dawson, Tilton, Fallon & Lungmus,
ATTORNEYS.

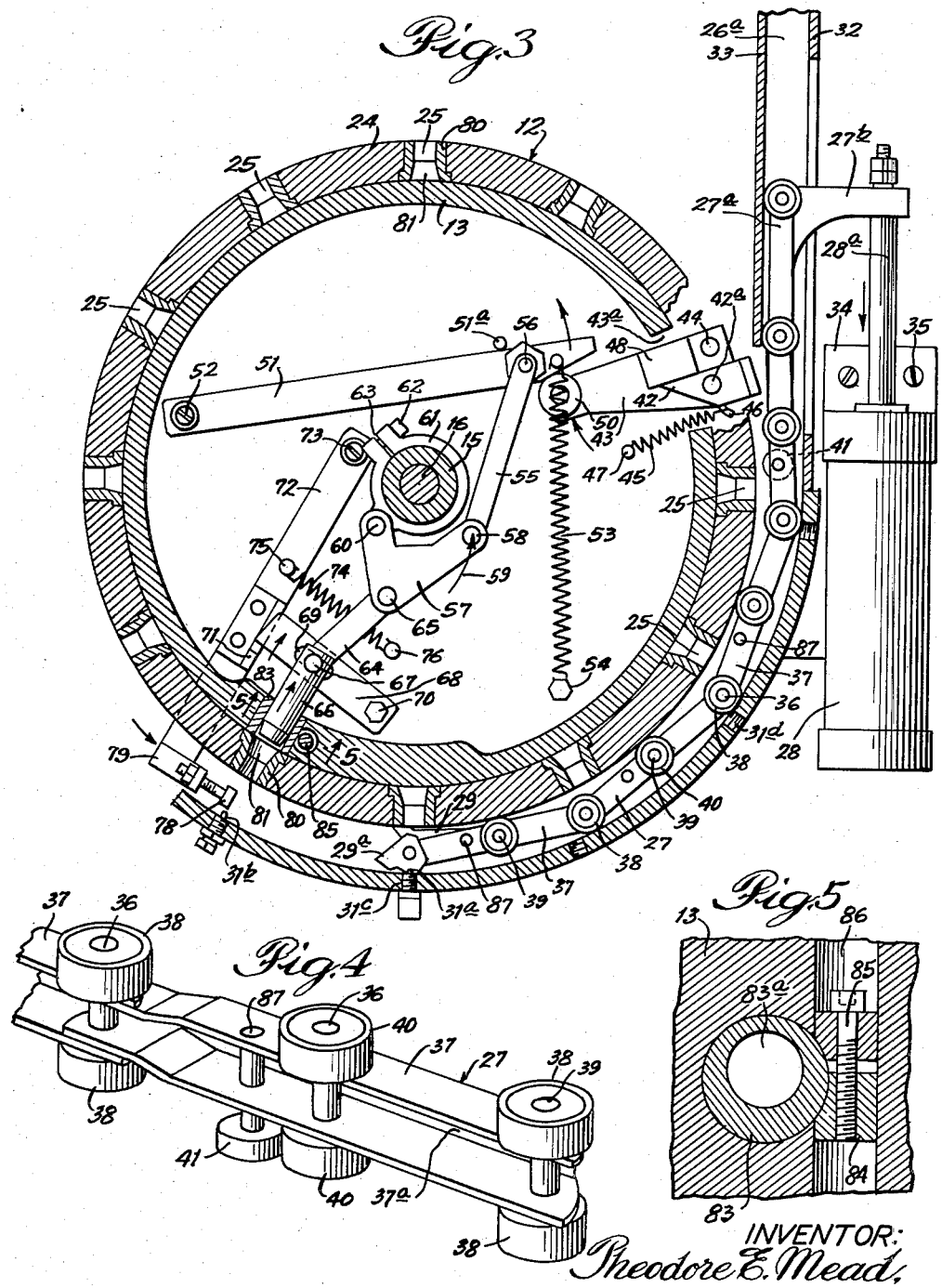

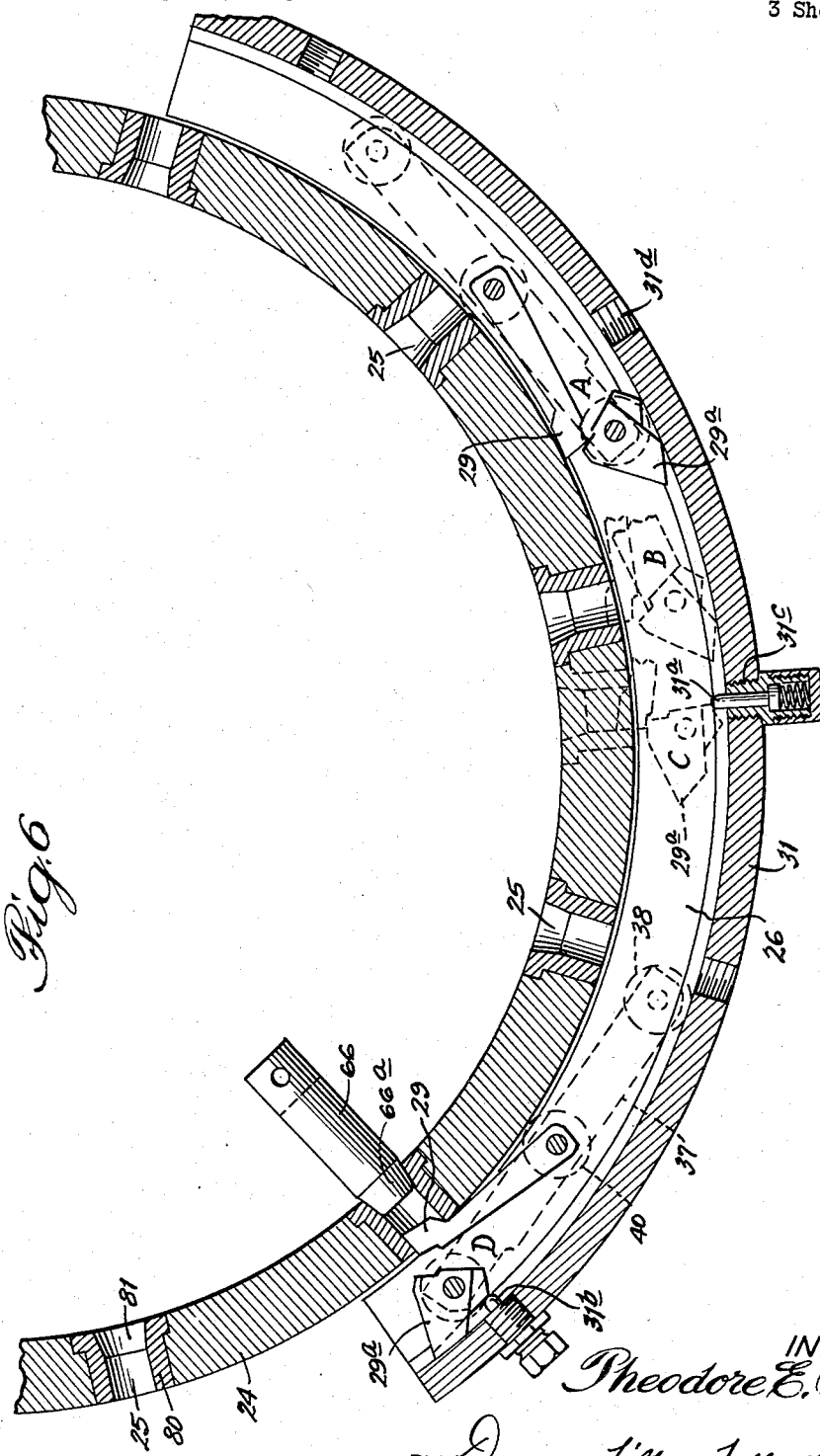

United States Patent Office 2,968,973
Patented Jan. 24, 1961

2,968,973
WORK FEEDING DEVICE
Theodore E. Mead, 1020 Michigan Ave., Wilmette, Ill.
Filed Aug. 29, 1958, Ser. No. 758,110
15 Claims. (Cl. 74—822)

This invention relates to a work feeding device, and, more particularly, to a rotary work feeding device.

The device of this invention has utility in advancing work pieces along a circular path to a work-performing station. Conventionally, this is done by mounting the work pieces on a turntable and then rotating the turntable so as to bring each piece into the work-performing station. Exemplary of the operations that can be performed in a work-performing station are drilling, reaming, tapping, broaching, etc.

The objective of a rotary work-feeding device is to immovably place a work piece in the precise position in the work station for only so long as the working operation requires and thereafter immediately to advance another work piece to the work station. This must be done smoothly and continuously and without fear of breakdown. The work-feeding devices heretofore known have been unable to achieve these desirable objectives. Some devices, because of the complex mechanisms employed, have been prone to frequent breakdowns. Others have introduced time-consuming delays in advancing workpieces. Still others have been unable to positively advance workpieces to a work station and thereafter immobilize them in the precise position required for the working operation.

It is a principal objective of this invention to provide a work-feeding device that achieves the desirable features outlined above without succumbing to the various shortcomings previously experienced. Another object is to provide a rotary work-feeding device in which the turntable-advancing means and the locking means therefor are uniquely interrelated so as to provide positive, precise positioning of a workpiece with a minimum of delay. Still another object is to provide a novel turntable-advancing means for a rotary work-feeding device. Yet another object is to provide, in a device of the character described, a turntable-advancing means which includes a path-conforming member that moves in both a rectilinear and curvilinear path.

A further object is to provide a novel locking means for the turntable of a rotary work-feeding device. A still further object is to provide a locking means for the turntable of a rotary work-feeding device which is operative to immobilize the turntable in a predetermined position except during the operation of means for rotating the turntable. A yet further object is to provide a rotary work-feeding device in which both the locking means and the turntable-advancing means engage the periphery of the turntable itself.

Other objects and advantages, both general and specific, can be seen as this specification proceeds.

This invention will be explained, in an illustrative embodiment, by the accompanying drawing, in which—

Figure 2:
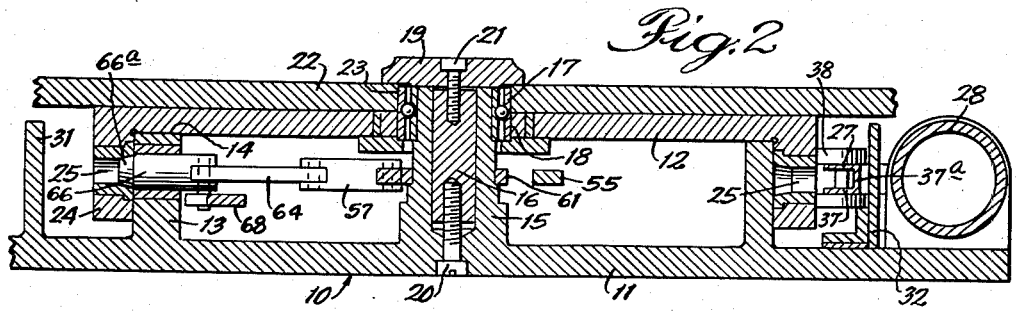

Fig. 1 is a top plan view, partially in section of a work feeder device; Fig. 2 is a fragmentary cross-sectional view taken along the line 2—2 of Fig. 1; Fig. 3 is a fragmentary top plan view, similar to Fig. 1, but showing moving elements in a different operative position; Fig. 4 is a fragmentary perspective view of a roller chain employed in the operation of the device; Fig. 5 is an enlarged cross-sectional view taken along the line 5—5 of Fig. 3; and Fig. 6 is an enlarged fragmentary top plan view, partially in section, of the device.

Referring now to the drawings, in which an embodiment of the invention is illustrated, the numeral 10 designates generally a rotary work-feeding device such as may be employed for sequentially bringing workpieces into a work-performing station. Device 10 includes a base 11 and a turntable, designated generally by the numeral 12. It is to be appreciated that turntables of various sizes can be provided from the same device merely by the expedient of securing larger work-supporting plates to turntable 12.

The numeral 13 designates an annular rib or hub which is provided on the top surface of base 11, the top surface 14 of the annular rib 13 being finished and providing a bearing surface for turntable 12. Also cooperating in rotatably mounting turntable 12 on base 11 is a center bearing structure including a central hub 15 provided integrally with base 11, a king-pin 16 carried in hub 15, and an anti-friction bearing 17 disposed between king-pin 16 and a central bore 18 in turntable 12. A bearing cap 19 and the top surface of hub 15 confine bearing 17 against vertical movement. King-pin 16 is secured in place within hub 15 by means of bolt 20, and bearing cap 19 is secured to king-pin 16 by means of bolt 21. Provided as part of turntable 12 is a dial plate 22 which is secured to turntable 12 and which is also equipped with a central opening as at 23 which, like opening 18 in turntable 12, receives bearing 17. Dial plate 22 is of a larger diameter than turntable 12 and thus permits the movement of workpieces (not shown) through a wide circular path. Turntable 12 is equipped with a depending skirt 24 about the periphery thereof, skirt 24 being provided with a plurality of indexing openings 25 arranged in equally-spaced relation about skirt 24 and having axes that lie on radii of the turntable. The openings 25 serve as indexing ports in that they function both to determine the angular movement of turntable 12 and also serve to lock turntable 12 in predetermined, angular positions.

The mechanism by which turntable 12 is rotated from one indexing position to the next will now be described. Essentially, this mechanism includes a path or track 26 provided in base 11 in which is positioned a path-conforming chain generally designated 27 and a fluid pressure cylinder 28 connected to one end of chain 27. A pawl 29 is secured to chain 27 adjacent the end opposite the end connected to cylinder 28. Reciprocation of the piston within cylinder 28 produces a corresponding reciprocation of chain 27. Chain 27, being fitted into a curvilinear track 26, follows the periphery of turntable 12 and ultimately pawl 29 enters an indexing port 25 under the influence of a leaf spring 30. Further movement of chain 27 results in rotation of turntable 12. During this movement, pawl 29 is maintained in engagement with port 25 by means of a cam-faced dog 29a pivotally mounted on the last link 27a of chain 27. Dog 29a is pivoted into engagement with pawl 29 by detent 31a in wall 31, as seen in Fig. 6, and is pivoted out of engagement by pin 31b.

The track or path 26 for the chain 27 is essentially trough-shaped, being defined on its outer side by an annular, upstanding wall 31 provided as a part of base 11. The inner side wall is provided by the depending skirt 24 of turntable 12, while the base of the track 26 is provided by the upper surface of base 11. A portion of the track is provided with a chain supporting guide as at 11a in Fig. 2.

The track 26 also has a rectilinear portion 26a, which has side walls 32 and 33 extending upwardly and integrally with base 11. Thus, with the chain and path structure just described, a linear force can, in effect, be applied "around a corner," i.e., tangentially to a circular object with a uniform speed and power throughout the arc. Base 11 is also equipped with a laterally-extending flange 34, to which cylinder 28 is secured as by bolts 35. The last link 27a of chain 27 is provided with a laterally-extending, integral arm 27b to which the piston rod 28a of cylinder 28 is secured. The cylinder 28 is so dimensioned that the piston thereof (not shown) contacts a cylinder end wall at the end of each stroke. This provides a smooth stroke both ways because there is no void at atmospheric pressure to be built up to operating pressure before the piston begins to move. I have found it desirable to employ this feature in cylinder 28 irrespective of the fluid employed to actuate the piston of cylinder 28. For this purpose, it is possible to use hydraulic fluids as well as pneumatic fluids such as air. Both ends of cylinder 28 are provided with fluid flow ports (not shown). These ports can be connected to suitable valves which permit both the inflow and outflow of fluid. Preferably, on the indexing stroke, i.e., the movement of chain 27 in which pawl 29 is in engagement with an indexing port 25 of turntable 12, the inlet and outlet fluids pass through needle valves so as to enhance smooth operation. On the return stroke, full flow of the actuating fluid is utilized in order to obtain a quick return.

Chain 27, in operating on the depending skirt or rim 24 of turntable 12, provides a distinct advantage over previously-employed intermediate parts such as ratchet plates or gears, in that the potential cumulative error in manufacture or assembly which would tend to upset indexing from a predetermined position, is reduced. The chain 27 also applies maximum rotating force, since it works at the edge of turntable 12. Chain 27 can take the form of a roller chain with the links articulating between alternate roller shafts 36. Each link 37 may take the form of a U-shaped channel, with the connecting wall 37a being disposed toward the outside of the turntable device 10. Each shaft 36 carries a pair of rollers 38 which are suitably journaled thereon by means of sealed ball bearings. Rollers 38 are disposed externally of the side walls of links 37. Intermediate the ends of each link 37 is disposed a vertical shaft 39 which is equipped with rollers 40 identically to rollers 38 on shafts 36. The link 37 at the end of chain 27 opposite the end connected to cylinder 28 is equipped with a pawl pivotally mounted on the intermediate shaft 39 of that link, the pawl 29 being urged inwardly against depending skirt 24 of turntable 12 by a leaf spring 30 which is mounted within the channel-like structure of the last link. From the foregoing, it is to be appreciated that chain 27 transmits the power and speed of the pistons within air cylinder 28 directly in what might be termed a one-to-one ratio. This will be the case irrespective of the number of links employed in chain 27, and additional links can be introduced when a longer cylinder 28 is employed, as where a lesser number of indexing openings 25 are provided so as to obtain greater angular movement of turntable 12 for each stroke of cylinder 28. Link 27a can be conveniently provided in solid form and fit within the channel-like confines of the next adjacent link 37. An intermediate link is equipped with a cam-engaging roller 41 which serves to actuate the locking mechanism which will now be explained.

The locking mechanism which is disengaged by roller 41 includes a cam 42 pivotally mounted as at 42a on a lever arm 43. Lever arm 43 is pivotally mounted as at 44 on base 11. Lever 43 extends inwardly of base 11 through an opening 43a in the upstanding rib or hub 13 thereof. A spring 45 is connected between an inner end portion of cam 42 as at 46 and at the other end to a post 47 extending upwardly from the top surface of base 11. Post 47 also serves as a stop for the pivotal movement of lever 43 around pivot 44. Lever 43 is provided with a raised portion 48, against which a side face 42b of cam 42 bears. Upon engagement of roller 41 with cam 42, cam 42 is pivoted clockwise about pivot 42a, thereby urging lever 43 to pivot about its pivotal mounting at 44 from the position shown in Fig. 1 into the position shown in Fig. 3. Return of chain 27 has no effect on the locking mechanism, inasmuch as cam 42 pivots in a counterclockwise direction to the position indicated in dotted line and designated by the numeral 49, being returned to the solid line position by spring 45.

Lever 43 is equipped at its inner end with a roller 50 which bears against an elongated lever member 51 pivotally mounted on base 11 as at 52. The clockwise movement of lever 43 induced by the contact of roller 41 with cam 42 pivotally moves elongated lever member 51 from the Fig. 1 position into the position shown in Fig. 3 against the resistance of spring 53 secured at one end to base 11 as at 54 and at the other end to lever member 52. The movement of member 51 is limited by a stop post 51a. This movement is translated through a link 55 pivotally connected at one end as at 56 to elongated lever member 54 and at the other end to toggle 57. The connection between link 55 and toggle 57 is also a pivotal connection as at 58. The movement of link 55 into the Fig. 3 position from the Fig. 1 position causes toggle 57 to move counterclockwise, as indicated by the arrow designated 59. Toggle 57 is pivotally mounted as at 60 on a collar 61 secured to hub 15. The angular position of collar 61 can be changed by loosening bolt 62, which joins together outwardly-extending split portions 63 of collar 62. Through this structure, the collar can be preset to apply maximum force to the opening engaging pin 66 at a position nearly on a radius of base 11.

Toggle 57 has generally a triangular appearance, with two of the angles thereof being pivotally connected at 58 and 60 as hereinbefore described. The third angle is pivotally connected to a link 64 as at 65. Link 64, at the end opposite the end connected to toggle 57, is pivotally connected to a locking-pin 66 as at 67. The counterclockwise movement of toggle 57 under the influence of link 55 moves link 64 into the position shown in Fig. 3 and retracts locking-pin 66 from its engagement with turntable 12 through opening 25. When locking-pin 66 has been so retracted, turntable 12 is free to rotate whenever pawl 29 engages one of the indexing openings 25.

Locking-pin 66 is maintained in a retracted position by means of a latch and keeper mechanism. Locking-pin 66 is equipped with a latch 68 which is pivotally connected to locking-pin 66 by means of a slot 69 intermediate the length of latch 68. Latch 68 is also pivotally mounted on base 11 at one end thereof as at 70. The retraction of locking-pin 66 rotates latch 68 clockwise, as indicated by the arrow in Fig. 3. At this stage, keeper 71 engages latch 68 to maintain locking-pin 66 in a retracted position. Keeper 71 is a projection mounted on keeper bar 72 which is pivotally mounted on base 11 at one end of the bar as at 73. Counterclockwise movement of keeper bar 72 into a latching relationship with latch 68 is induced by spring 74 which is connected at one end to an intermediate point of latch bar 74 as at 75, and at the other end to base 11 as at 76.

As chain 27 has its pawl 29 engage an indexing opening 25 of turntable 12 and rotates the same to a new indexing position, the end roller of chain 27 ultimately reaches a position shown in dotted line and designated 77, seen only in Fig. 1. At this point, the end roller contacts a bolt 78 adjustably mounted in the end 79 of keeper bar 72 opposite the end pivotally mounted on base 11 at 73. Further movement of chain 27 rotates keeper bar 72 clockwise against the resistance of spring 74 and disengages keeper 71 from latch 68, permitting locking-pin 66 to enter another indexing opening 25.

Helpful in maintaining pawl 29 in engagement with an indexing opening 25, is dog 29a, which, as has been pointed out previously, is pivotally mounted on the last link 27a of chain 27. The operation of the dog in maintaining pawl 29 in engagement with indexing opening 25 can be best appreciated from a consideration of Fig. 6, in which successive locations of the last link 27a are shown in dotted line. In the first position designated A, the pawl 29 is urged against the wall of skirt 24 by spring 30 at a point intermediate indexing openings. Further forward motion of chain 27a brings the last link thereof into the position designated B and in which pawl 29 engages indexing opening 25. Slight further forward movement of chain 27 brings dog 29a into engagement with a spring-mounted detent 31a in the position of chain designated C. Thereupon, dog 29a is rotated in a clockwise fashion to urge pawl 29 into locking engagement with indexing opening 25. At this time, the dog 29a is so positioned as to resist any outward movement of pawl 29. Any outward movement of pawl 29 (as might be produced by the turntable rotating more rapidly than the chain) merely tends to rotate dog 29a more in a clockwise direction and thus force the stepped portion 29b of pawl 29 against bushing 80. It is to be appreciated that pawl 29 should be fairly readily removable from engagement with indexing opening 25 upon relative movement between chain 27 and turntable 12 so as to permit disengagement of pawl 29 at the end of an indexing stroke. For this purpose, the stepped portion 29b is beveled so that chain 27 can be readily retracted at the end of a stroke. However, during the indexing of the turntable, the turntable tends to act as a flywheel because of the large concentration of weight, and might pass the pawl 29 if means were not provided for positively locking the pawl 29 in indexing opening 25 over the indexing stroke. At the end of the stroke, the dog 29a engages a pin 31b which rotates dog 29a in a counterclockwise fashion and thereby permits pawl 29 to be withdrawn from the indexing opening. The position at which the dog is rotated counterclockwise is designated in Fig. 6 by the letter D.

The entry of locking-pin 66 into indexing opening 25 is facilitated in two ways: First, the bushing 80 which is fitted into skirt 24 to provide opening 25, is axially tapered as at 81 and is further provided with a tapered entry slot or lead-in 82, which serves to direct locking-pin 66 into the indexing opening 25. The locking-pin 66 is provided with a forwardly-tapered portion 66a which aids in this respect. Secondly, bushing 83 in rib 13 (seen in enlarged section in Fig. 5) is provided with an eccentric bore 83a which is aligned with the indexing opening 25 provided in bushing 80. Thus, bushing 83 can be rotated so as to position the bore 83 at the proper place for maintaining the turntable 12 in any desired plane. Additionally, the turntable can be held down on base 11 as well as being in a desired radial position with respect to the work-performing device. Bushing 83 is maintained in a given position by means of a split locking collar 84, the two parts of which are held together by means of a tangent bolt 85. A tangential holt 86 is provided in depending skirt 24 to receive collars 84 and tangent bolt 85.

When locking-pin 66 has entered a new indexing opening 25, chain 27 can be retracted by the reciprocation of the piston within cylinder 28. The signal for this operation may be derived from any convenient source, as, for example, a limit switch or end poppet valve associated with cylinder 28, or by a signal derived from the work-performing mechanism. In any event, it is important to note that chain 27 is retractable by the operation of cylinder 28 during the work-performing step to a position in which it is immediately ready to rotate the turntable to a new indexing position as soon as the work-performing step is completed. However, the turntable 12 is in locked position at all times except when the chain 27 is moving the turntable to the next station.

It is to be appreciated that by virtue of the locking mechanism operating on the rim of the turntable itself, as well as the rotating means, a potential cumulative error in manufacture and assembly is also reduced that might otherwise result in mispositioning of the turntable.

The trouble-free operation of device 10 is facilitated by the novel construction of chain 27. Chain 27, in having three sets of rollers in each link, is adapted to move smoothly in track 26 inasmuch as two sets of rollers bear against the outer rib or flange 31 of base 11, while the intermediate top roller bears against the depending skirt 24 of turntable 12. The provision of a pair of rollers on each shaft 39 permits the rollers to straddle the indexing openings 25 and further contributes to the smooth, trouble-free operation of device 10. Each link 37 of chain 27 can be provided with an additional pair of top and bottom openings as designated at 87, which are adapted to receive the shaft-supporting roller 40 in the event relocation of that roller is desired. For example, relocation of roller 41 to the opening designated 87 will permit the reduction of indexing stations from the 12 shown, to 6. Corresponding relocation of detent 31a to other positions can likewise be conveniently provided. For example, the opening 31c permits 12 stations, while that designated 31d achieves four stations.

The cylinder 28 can be correspondingly altered so as to continue the desirable feature of having the piston bottoming on the cylinder head at the end of each stroke. Where the cylinder length is to be shortened, as where the number of indexing stations is to be increased, solid inserts for the cylinder can be utilized.

While, in the foregoing specification, a detailed description of an embodiment of the invention has been given for the purpose of illustrating the invention, it will be appreciated by those skilled in the art that many variations are possible without departing from the spirit and scope of the invention.

I claim:

1. In a rotary work-feeding device, a circular turntable rotatably mounted on a base and having a plurality of equally-spaced indexing openings provided in the rim thereof, a locking mechanism on said base including locking-pin means adapted to be removably inserted into each of said openings in sequence, and turntable-rotating means on said base for moving said turntable by engaging one of said openings when said pin means has been retracted from another opening, said base being provided with an upstanding rib inward of the rim of said turntable, an opening in said rib being equipped with a rotatable bushing having an eccentric opening therethrough, said turntable-rotating means including a track about said turntable, a chain slidably mounted in said track and equipped with a pawl for engaging said openings, and a fluid pressure cylinder connected to said chain for reciprocating the same.

2. The structure of claim 1, in which latching means are provided on said base for maintaining said locking-pin means in a retracted position.

3. The structure of claim 2, in which the said latching means ceases maintaining said locking-pin means in retracted position upon a signal from said rotating means.

4. The structure of claim 1, in which each of said indexing openings is equipped with a centrally tapered lead-in slot on the inner end thereof.

5. In a work feeding device, a base, a circular turntable rotatably mounted on said base and having a plurality of equally-spaced indexing ports disposed about the periphery thereof, a track on said base adjacent said turntable, a pawl-equipped chain movably mounted in said track, means on said base for reciprocably moving said chain, and locking means for said turntable on said base coupled to said moving means, said locking means being moved into unlocking relation with said turntable upon initial actuation of said moving means whereby said pawl is adapted to move said turntable by engagement with one of said ports.

6. In a work feeding device having a turntable rotatably mounted on a base and having a plurality of equally-spaced indexing openings in the circular periphery thereof, a curved track on said base about a portion of the periphery of said turntable, said track having a straight portion at one end thereof, a track-conforming member movably mounted in said track, means on said base coupled to the end of said member in said straight portion for reciprocating said member end and for moving the entire member in said track, and pawl means on the portion of said member in the said curved track, said pawl means being positioned in contacting relation with said turntable and thereby being movable into engagement with one of said openings when said member is moved.

7. The structure of claim 6 in which the said reciprocating means is a fluid-operated cylinder and piston unit mounted on said base and connected to the said end of said member.

8. In a circular turntable-equipped work feeding device, a path-providing base about a portion of the periphery of said turntable, said path having a curvilinear and a rectilinear portion, an elongated, substantially non-extensible path-conforming member positioned in said path and equipped with pawl means for advancing said turntable, means on said turntable adapted to be releasably coupled to said pawl means whereby movement of said member results in turntable rotation, and means on said base coupled to said member for moving said member lengthwise of itself.

9. The structure of claim 8 in which the said member is a roller-equipped chain having channel-shaped links with the rollers thereof disposed outwardly of the side walls of the channel-shaped links, each link having rollers at at least three points along its length.

10. The structure of claim 9 in which the said base also supports a turntable-locking mechanism, the said mechanism being actuated to unlocking and locking conditions by movement of said chain, said chain being equipped with positionable actuating means for said mechanism, said mechanism including a portion extending into said path for engagement with said actuating means.

11. In a rotary work feeding device, a base, a circular turntable rotatably mounted on said base, said turntable being equipped with a depending annular flange, said flange having a plurality of equally spaced radially-directed indexing openings therein, an upstanding annular flange on said base outwardly of the flange on said turntable and defining therewith a chain track, a chain movably mounted in said track and equipped with an inwardly-extending pawl adapted to be received in said openings, means for moving said chain, and means on said base for removably inserting a locking-pin in said openings, the last mentioned means including a linkage assembly mounted on said base with a portion thereof extending into said track for engagement with actuator means on said chain, said actuator means being effective to retract said locking-pin before said pawl engages an opening.

12. The structure of claim 11 in which said assembly includes a lever extending into said track, said lever being engageable with said chain for inserting said locking-pin into one of said openings.

13. The structure of claim 11 in which said assembly includes toggle means adjustably and pivotally mounted on the central portion of said base, said toggle means being pivotally connected to said locking-pin, said toggle means and said locking-pin being so oriented with respect to said base and turntable as to cause said locking-pin to assume a generally radial direction just prior to entrance of said pin into one of said openings.

14. In a work feeding device, a base, a circular turntable rotatably mounted on said base and having a plurality of equally spaced indexing ports disposed about the periphery thereof, pawl-equipped chain means movable in a track about said turntable for engaging one of said ports to rotate said turntable, lock means on said chain for positively maintaining said pawl in engagement with one of said ports, said lock means for said pawl including a cam-faced dog pivotally mounted on said chain, detent means positioned on said track in the path of said dog for engagement therewith, and locking means on said base engageable with one of said ports.

15. The structure of claim 14 in which said detent means includes spaced-apart posts operative to pivot said dog in opposite directions, the post first in the path of said dog being effective to urge said pawl into one of said ports while the other of said ports is effective to permit disengagement of said pawl from said one of said ports.

References Cited in the file of this patent

UNITED STATES PATENTS 2,392,964 Armitage et al. _____ Jan. 15, 1946